Figure 1:
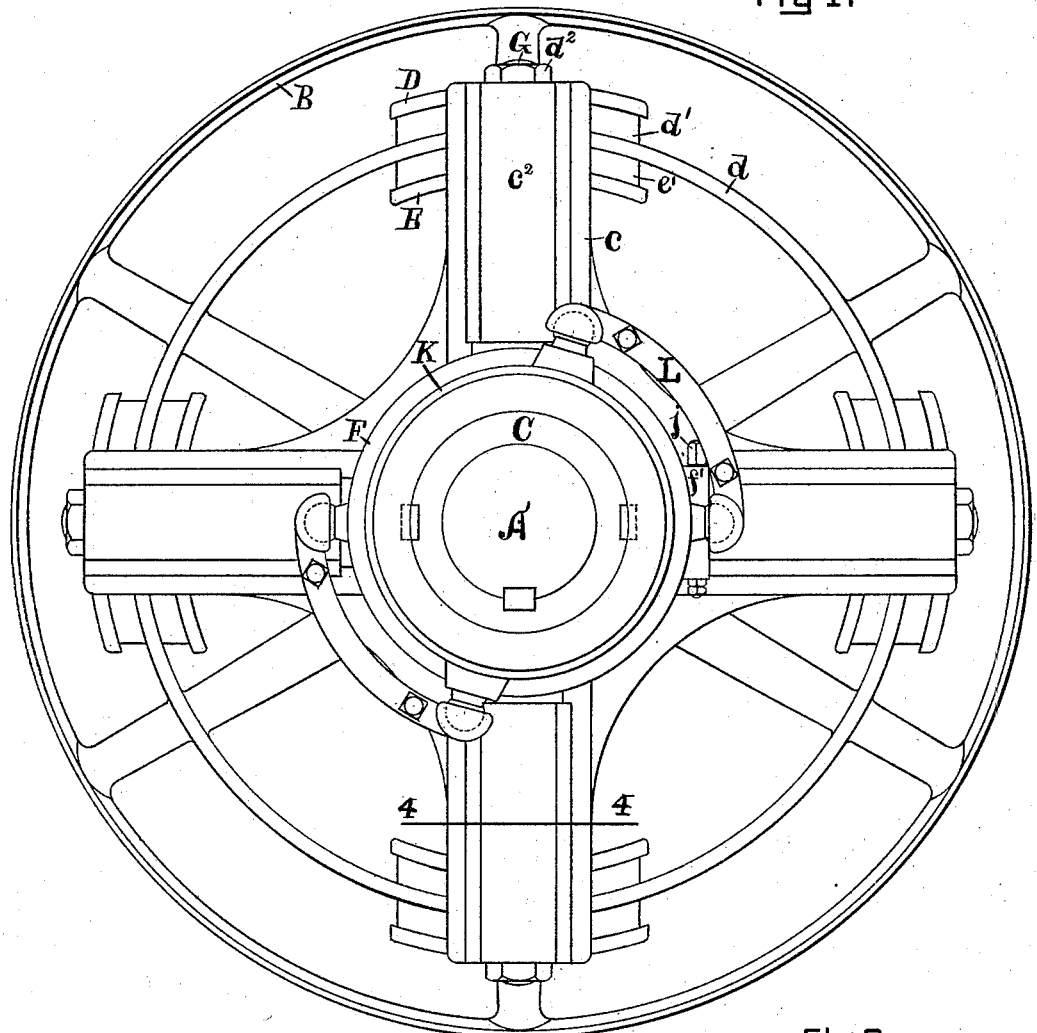

(No Model.)  2 Sheets—Sheet 1.

H. W. HILL.
FRICTION CLUTCH.

No. 468,616. Patented Feb. 9, 1892.

WITNESSES:
Frank Miller
N. J. Bainbridge

INVENTOR:
Harry W. Hill
By his Attorneys
Watson & Thurston

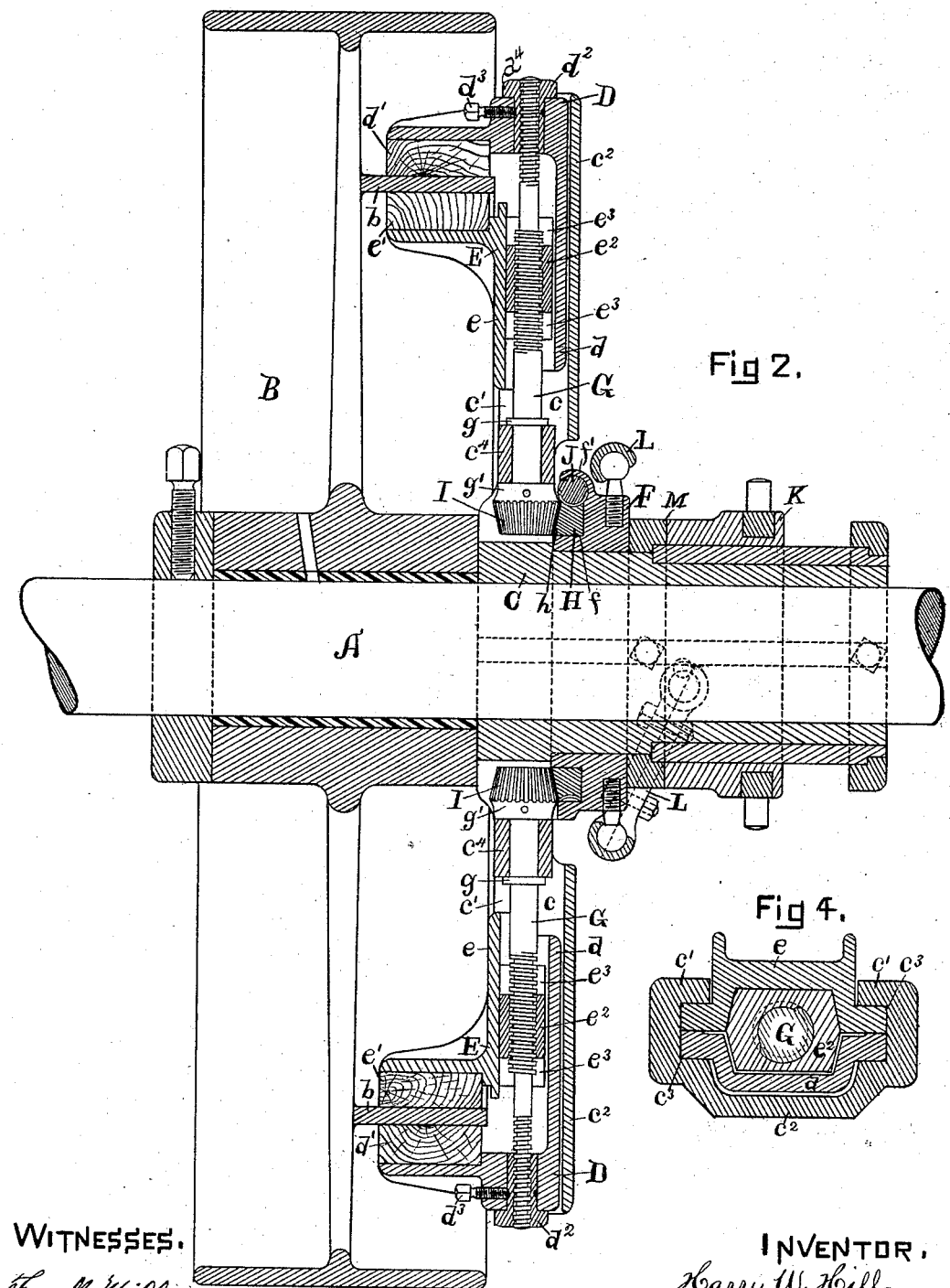

UNITED STATES PATENT OFFICE.

HARRY W. HILL, OF CLEVELAND, OHIO.

FRICTION-CLUTCH.

SPECIFICATION forming part of Letters Patent No. 468,616, dated February 9, 1892.

Application filed September 14, 1889. Serial No. 323,906. (No model.)

*To all whom it may concern:*

Be it known that I, HARRY W. HILL, a citizen of the United States, and a resident of Cleveland, county of Cuyahoga, and State of Ohio, have invented certain new and useful Improvements in Friction-Clutches, of which the following is a full, clear, and exact description, reference being had to the accompanying drawings.

My invention relates to that class of friction-clutches in which a pair of clutch members—one adapted to engage upon the outer and the other upon the inner surface of a cylindric pulley-flange—are moved simultaneously toward and from each other and the interposed pulley-flange for the purpose of grasping and releasing the same.

The principal object of my invention is to provide novel mechanism for giving to the two jaws their simultaneous inverse movement.

To this end it consists, broadly, in the combination of a pulley having a cylindric flange, a pair of clutch members adapted to engage upon the outer and inner surfaces of said flange, a clutch-arm upon which they are movably supported, with suitable inclined surfaces, which engage with said members and by their movements cause said members to move inversely, and suitable mechanism for moving said inclined surfaces.

It also consists in the combination of a flange cylindrical to the shaft, a radial clutch-arm, a pair of clutch members mounted thereon, and a screw having right and left handed threads, which engage with said members, respectively, and suitable mechanism for revolving said screw, and also in the combinations of elements and details of construction which are herein described, and definitely pointed out in the claims.

I will now proceed to describe in detail the embodiment of my invention shown in the drawings, which is the best form now known to me.

Figure 3:
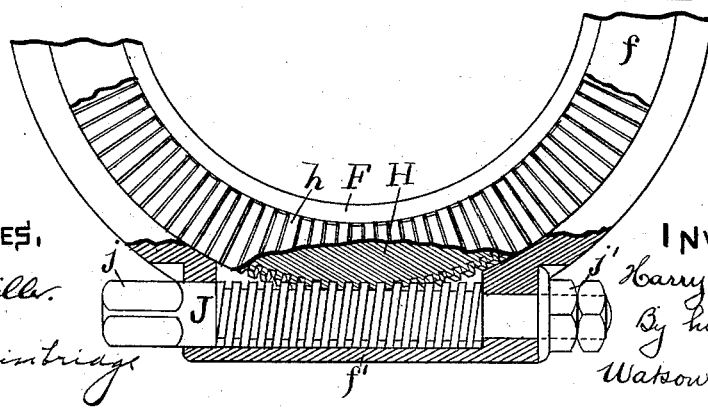

Referring now to the drawings, Figure 1 is a side elevation of a clutch in which four distinct clutch systems are employed and which embodies my invention. Fig. 2 is a central sectional view of the same. Fig. 3 is an end view of a part of the collar F, the gear-ring H, which it carries, and the means which adjustably connect the collar and ring together. Fig. 4 is an enlarged sectional view on line 4 4 in Fig. 1.

Referring to the parts shown in the drawings, A represents the shaft. B represents the pulley mounted thereon, which is provided with a cylindric pulley-flange $b$.

C represents a hub, from which radiate as many clutch-arms $c$ as it is desired to employ clutch systems. This hub and the arms constitute what is commonly called the "clutch-frame." It is customary to connect the hub C to the shaft, and it is shown so connected by the key $a$. It is well known in the art that these clutch-arms and clutch systems are arranged about the hub in such a manner as to balance the mechanism upon the shaft. Therefore I have shown four arms in the drawings, although the number of the arms is not at all material to the invention. The clutch-arms $c$, as shown, consist of the parallel bars $c'$, which are connected by a yoke $c^2$. These side bars $c'$ are provided upon their proximate faces with parallel longitudinal grooves $c^3$. The clutch members shown are of the same general form as those shown in Letters Patent No. 312,122, granted February 10, 1885, to me. The outer clutch member D consists of an inwardly-directed shank $d$ and an overhanging jaw $d'$, which is shaped to fit the outer periphery of the flange $b$. The inner clutch member E is also provided with an inwardly-directed shank $e$ and jaw $e'$, shaped to fit against the inner surface of said pulley-flange. As shown in the drawings, the shanks $d$ and $e$ of the clutch members are grooved longitudinally, so that when they are mounted in the clutch-arm a recess will be left between them. The edges of the two shanks enter the grooves $c^3$ in the clutch-arms, and they are thereby supported and guided in their movements in straight radial lines. A screw G, having a right-hand thread $g^2$ in one part of its length and a left-hand thread $g^3$ in another, is mounted upon each of the clutch-arms and extends outward through the recess left between the two jaw-shanks $d$ and $e$. This screw is prevented from having any movement but a rotary movement by a yoke $c^4$, which is fastened to the side bars of the clutch-arm and the collars $g$ $g'$ on the screw. The outer screw-thread engages with the outer clutch member D and the inner screw-thread engages with the inner clutch member E. The specified means whereby the screw-threads engage with the two clutch members, which, however, are not essential to the embodiment of the broad invention, consist, first, in a screw-box $d$, having an enlarged bolt-head $d^4$ on its outer end, whereby it may be revolved. This bolt-head engages with the outer clutch member and causes the same to be drawn inward as the box is screwed onto the screw. This box is free to revolve within its seat in the end of the clutch member D until said clutch member has been drawn to its proper position relative to the inner member and the interposed flange, when it is locked by means of the set-screw $d^3$. The inner clutch member is also provided with a removable box $e^2$, through which the screw passes and which is held in engagement with said inner clutch member by the lugs $e^3$, which project from the shank $e$ at both ends of said box. The box $e^2$ is prevented from becoming displaced sidewise by its position between the two jaw-shanks. This removable box renders the device somewhat less expensive. A collar F surrounds the hub C and is free to revolve thereon. In the face of this collar nearest the clutch-arms an annular groove or socket $f$ is cut, and into this groove is fitted so that it may be revolved a gear-ring H. Upon the face of this ring H beveled gear-teeth $h$ are cut, which engage with the beveled gear-wheels I, which are rigidly fastened to the inner ends of screws G. On the outer periphery of this gear-ring H are cut teeth, which form a rack $a'$. A worm J is mounted in a projection $f'$ upon the collar F, substantially as shown, and extends through collar F to a position where it engages with the rack $h'$. It is provided at one end with a bolt-head $j$, by which it may be revolved, and at the other end with set-nuts $j'$, by which it may be locked at any desired point in its revolution. This worm J serves as the means whereby the ring H is rigidly connected with the ring F and also as the means whereby the simultaneous adjustment of all the clutch system is effected.

K represents the usual sliding sleeve which surrounds the shaft. It is compelled to revolve with the hub C by means of a spline connection therewith, but is permitted to slide longitudinally upon said hub.

L L represent links, which are secured at their ends, respectively, to the ring F and the sliding sleeve K by ball-and-socket joints, and the points of attachment of the ends of each link being in different radial planes and distant from each other, preferably, about one-sixth of the circumference.

The parts hereinbefore described may be assembled as follows: The screw G is mounted in the clutch-arm in the manner shown. The inner clutch member E is then seated upon said clutch-arm with the box $e^2$ in its described position and the screw G revolved until said clutch member has been drawn in the desired position. The outer clutch member is then seated upon the clutch-arm and the box $d^2$ revolved until said clutch member has been drawn to its proper relative position, when the screw $d^3$ is screwed against the box $d^2$ and a further revolution thereof prevented. The collar F, with the gear-ring H in position, is then slipped upon the hub and the gear-teeth $h$ made to engage with the gear I. A collar M is then slipped upon the hub against said ring F, and there fastened by means of a set-screw or some other appliance. The purpose of this collar M is to prevent the ring F from moving laterally away from the clutch-arm and thereby permitting a disengagement of the gear-teeth before mentioned. The sliding sleeve K is then placed in position and the links L connected, as before explained, with said sliding sleeve and collar F.

The parts being thus assembled, their operation is as follows: When the sliding sleeve K is moved toward the collar F, said collar is caused to revolve upon the hub by reason of its connection with said sliding sleeve by the links L and the inability of said sleeve to revolve. The gear-ring H, being rigidly connected with the collar F, also revolves, and in its revolution causes all of the screws G to be revolved simultaneously. The screws G in revolving force the inner clutch members outward, and at the same time draw the outer clutch members inward until the jaws of both come into engagement with the pulley-flange, which is thereby firmly grasped between them. When it is desired to release the pulley-flange, the sliding sleeve K is drawn in the opposite direction, or away from the collar F, and a reverse movement of the various elements constituting the connecting mechanism between the clutch members and said sleeve follows, whereby the clutch members are simultaneously moved in the contrary direction, with the result of releasing the pulley-flange. Some of the patentable combinations of parts shown and described herein were not invented by me alone, but are the joint invention of myself and Louis J. Hirt, and are described and claimed in Letters Patent No. 409,586, granted August 20, 1889, to myself and said Hirt, and in an application now pending, Serial No. 309,035, filed April 29, 1889.

Having thus described the preferred embodiment of my invention, what I claim as new, and desire to secure by Letters Patent, is—

1. In a friction-clutch, the combination of a radial clutch-arm having two parallel bars, which are grooved upon their proximate faces, a pair of clutch members of the general type specified, the shanks of which are formed with longitudinal grooves, thereby forming a recess between them through which the screw can pass, the shank of the inner clutch member having the projecting lugs $e^3$ $e^3$, with a screw having right and left handed screw-threads mounted in said clutch-arm, a screw-box held in engagement with the inner member between the lugs $e^3$ $e^3$, an adjustable connection between the screw and the outer clutch member, a sliding sleeve upon the shaft, and suitable mechanism connecting the sliding sleeve with said screw, whereby the screw is revolved by the back-and-forth movement of said sleeve, substantially as and for the purpose specified.

2. In a friction-clutch, the combination of a pulley having a cylindric flange, a pair of clutch members adapted to engage upon the outer and inner surfaces of said flange, and a clutch-arm upon which they are movably supported with a screw having right and left handed screw-threads, which engage with said members, respectively, an adjustable connection between said screw and one of said members, and suitable mechanism for revolving said screw, substantially as and for the purposes set forth.

HARRY W. HILL.

Witnesses:
E. L. THURSTON,
LEONARD WATSON.